United States Patent [19]

Arato

[11] 4,335,800

[45] Jun. 22, 1982

[54] VEHICLE WITH AT LEAST THREE WHEELS PIVOTING ABOUT A VERTICAL AXIS

[76] Inventor: Laszlo Arato, Seebuchtstr. 19, 6374 Buochs, Switzerland

[21] Appl. No.: 30,541

[22] Filed: Apr. 16, 1979

[30] Foreign Application Priority Data

Apr. 17, 1978 [CH] Switzerland .................. 4062/78

[51] Int. Cl.³ .................. B62D 1/00; B62D 5/04
[52] U.S. Cl. .................. 180/236; 180/140; 180/234; 280/91
[58] Field of Search .............. 180/233, 234, 236, 140; 280/91

[56] References Cited

U.S. PATENT DOCUMENTS

| | | | |
|---|---|---|---|
| 3,092,201 | 6/1963 | Biek | 180/140 |
| 3,387,684 | 6/1968 | Belke et al. | 180/140 |
| 3,532,178 | 10/1970 | Lindbom | 280/91 |
| 3,572,458 | 3/1971 | Tax | 280/91 |
| 3,666,034 | 5/1972 | Stoller et al. | 180/236 |
| 3,903,983 | 9/1975 | Yeske | 180/140 |
| 3,933,215 | 1/1976 | Scheuerle | 180/140 |
| 3,972,379 | 8/1976 | Norris | 180/234 |
| 4,008,783 | 2/1977 | Herrmann et al. | 180/140 |

*Primary Examiner*—Joseph F. Peters, Jr.
*Assistant Examiner*—Donn McGiehan
*Attorney, Agent, or Firm*—Darby & Darby

[57] ABSTRACT

A vehicle with unlimited mobility in all directions in the driving plane, in which the wheels are provided with a pivot drive which is set on the basis of values determined by a computer. The calculation is effected according to an algorithm, whose basis results from the geometric relations of triangles whose corner points are formed by the respective pivot axis of the wheel, the vehicle center M, and the center Dn, D'n of the instantaneous track curve.

6 Claims, 10 Drawing Figures

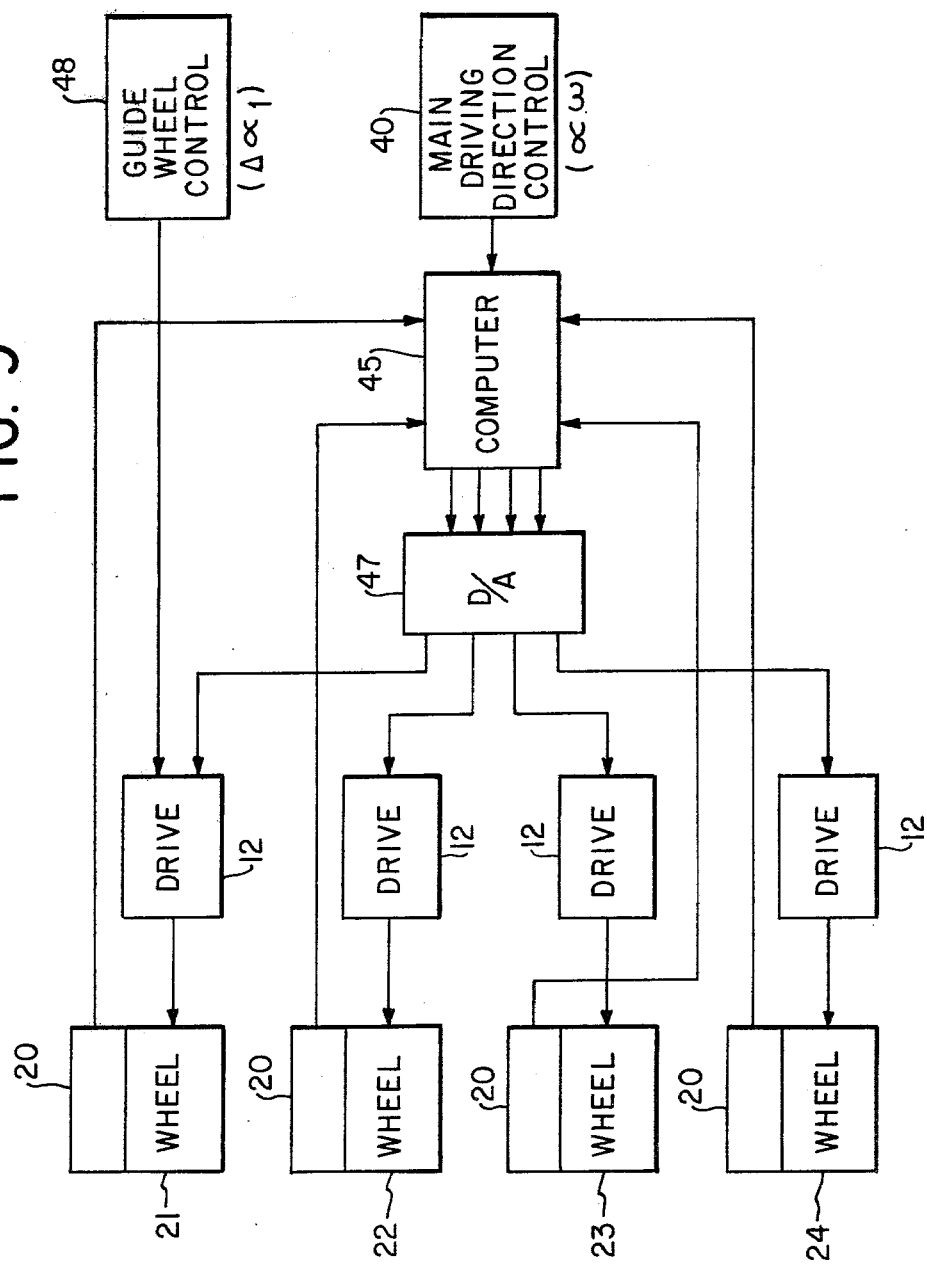

VEHICLE WITH AT LEAST THREE WHEELS PIVOTING ABOUT A VERTICAL AXIS

Vehicles of known design generally have one or two wheels steered by a steering wheel, while the other wheels do not change their angular position or set themselves into a selected driving direction by free pivotability.

For many applications, e.g. aircraft tractors, artillery and rocket mounts, washing trucks, transport vehicles in production and storage halls, the resulting limited mobility of the vehicle is not sufficient, and a vehicle is needed which can follow any curve and also turn about its own center. It was found that mechanical steering systems are not enough to satisfy this long existing need in a satisfactory manner. The problem of satisfying this need is solved by a vehicle, in accordance with the present invention.

The invention will be described below on the basis of embodiments represented in the drawings.

Figure 8A:
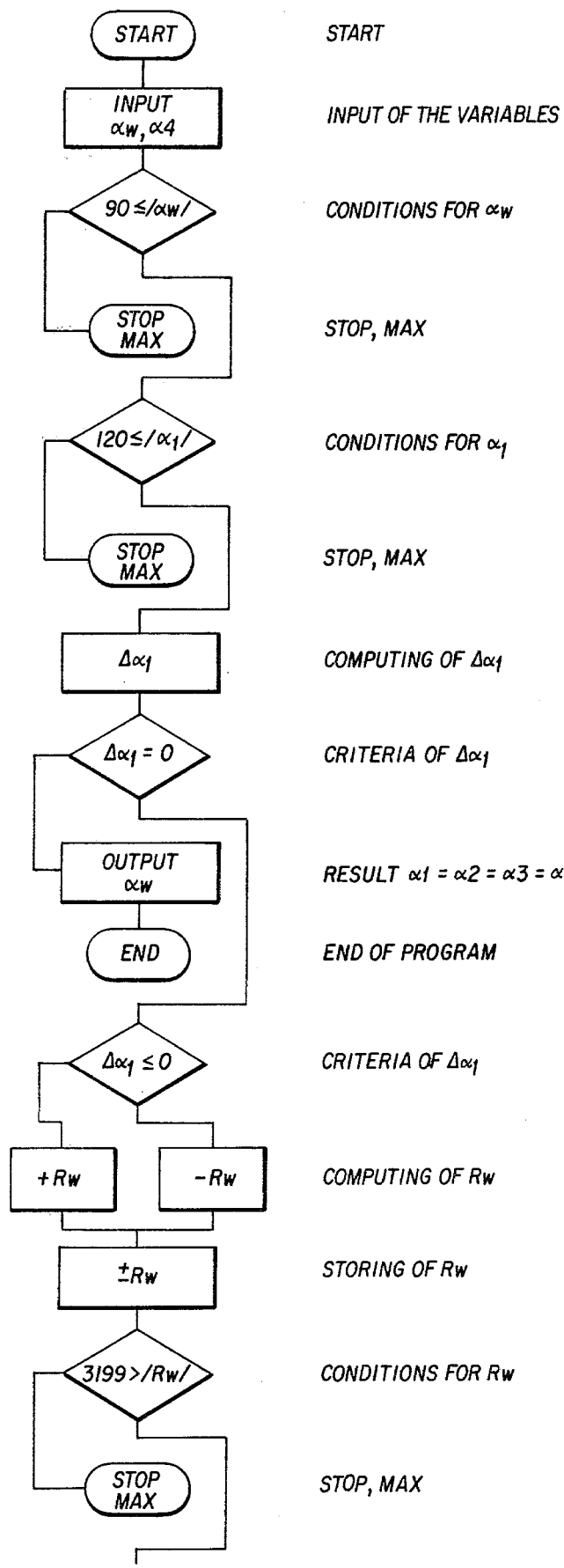
Figure 8B:
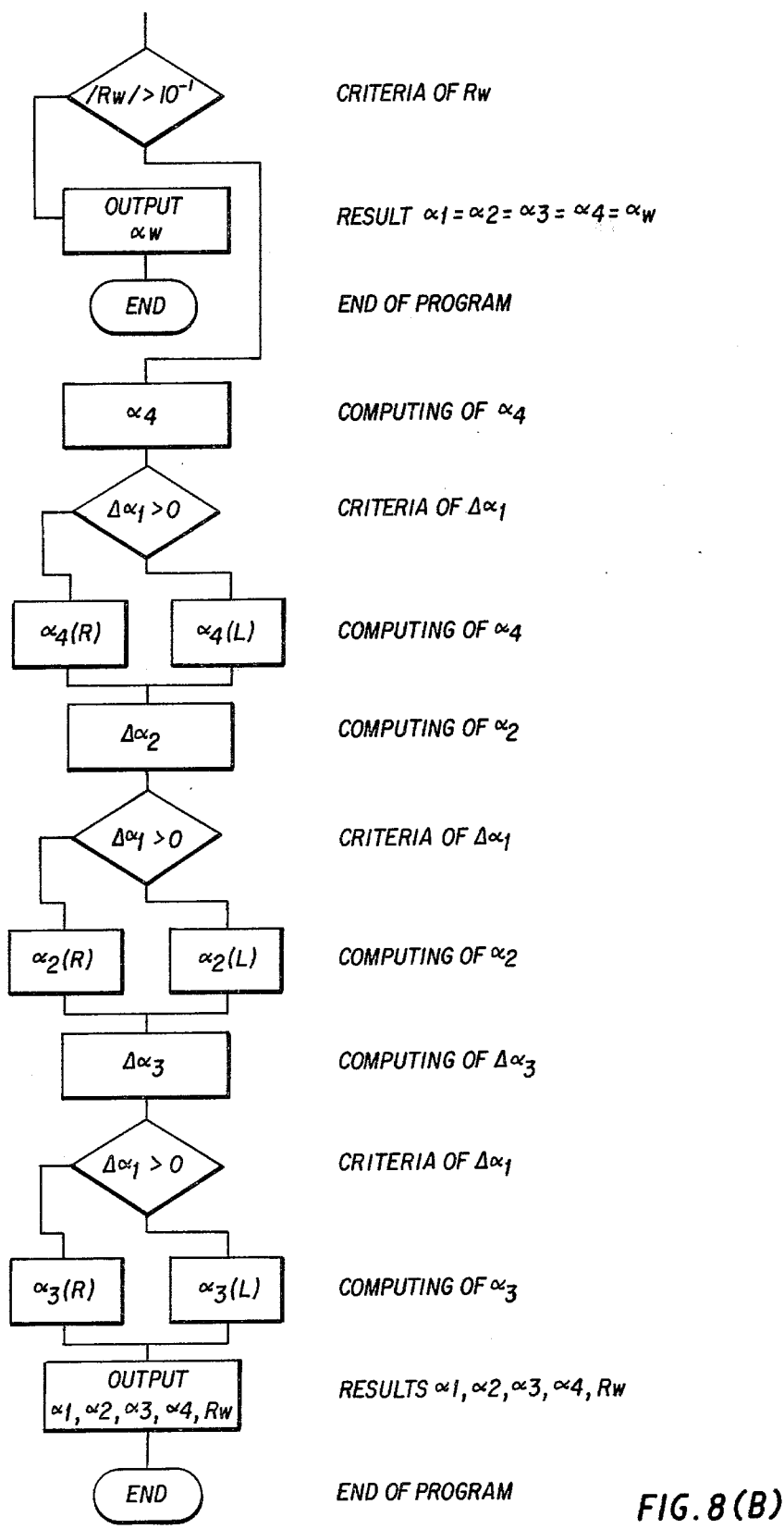

FIGS. 8(A) and 8(B) is a flow chart of the algorithmic calculation; and

FIG. 9 is a schematic diagram of the system.

Figure 1:
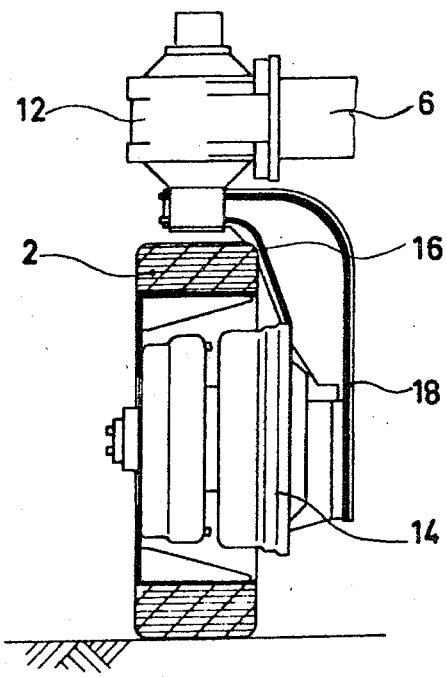
FIG. 1 is an elevational view, partly in section, of a wheel with a hub drive and adjusting drive.
Figure 2:
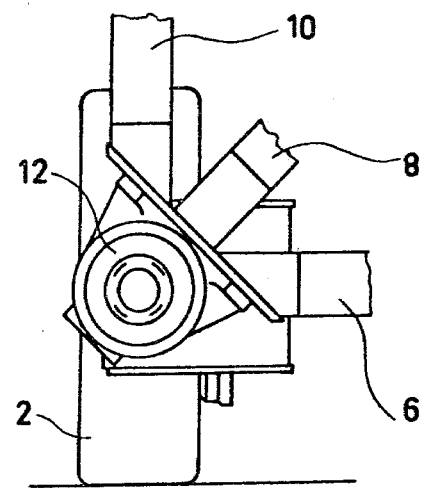
FIG. 2 shows a top view of the arrangement according to FIG. 1 with a part of the chassis, of a vehicle.
Figure 3:
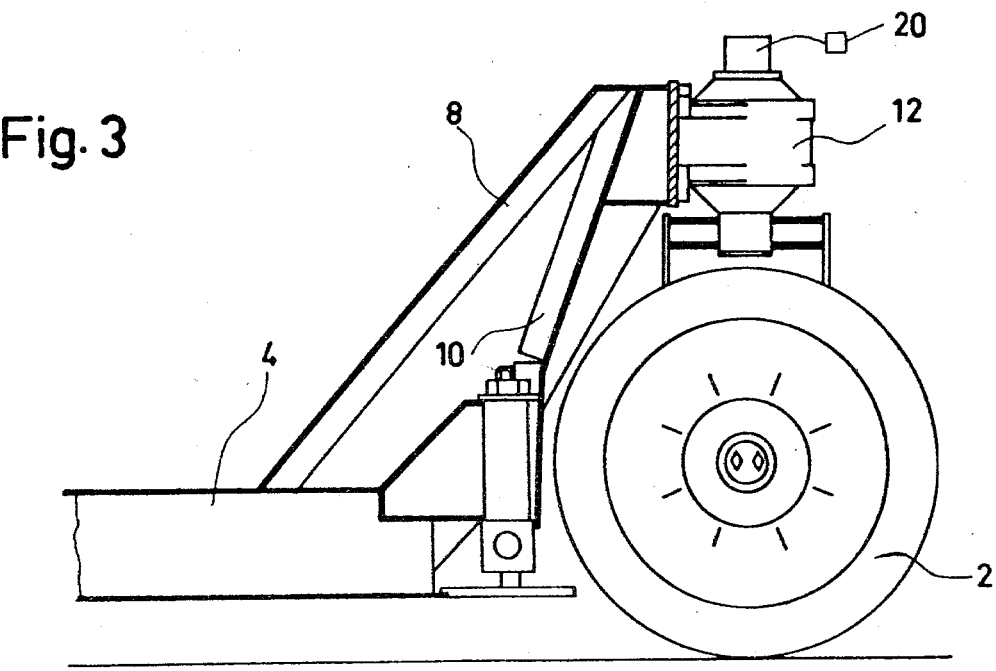
FIG. 3 is a side elevational view of the outside of the wheel of the arrangement according to FIGS. 1 and 2.

The vehicle has, for example, a wheel at each corner of a chassis. This is shown diagrammatically in FIGS. 4-7 with the wheels being designated as 21, 22, 23, 24. FIGS. 1-3 show one of the wheels, designated 2, connected to the chassis, designated 4. Each of these four wheels is held according to the representation of FIGS. 1 to 3 on the chassis by brackets 6, 8, 10 which also hold on an adjusting drive 12. The adjusting drive 12 serves to effect a mechanically independent angular shift of the respective wheel about a vertical axis. Any known hydraulic rotary wheel drive can be used for drive 12, one suitable drive being commercially available under the name "Hyd-ro-oc" and which is described in detail in a brochure by Mageba SA.

In addition, each wheel is preferably connected to a wheel hub drive 14, which can be driven hydraulically, like the angle adjusting drive 12. The lines 16, 18 serve to supply and remove the hydraulic fluid to or from a hydraulic source (not shown). Such a hydraulic wheel hub drive is distributed, for example, by Poclain, USA. In addition, each wheel has an angle position transmitter 20, connected to it. The transmitter can be a potentiometer or selsyn type pickoff which provides a signal of an angular displacement of the wheel relative to a given 0° direction. The output of the transmitter 20 is connected to a central electronic control unit or computer (not shown).

One of the four wheels shown in FIGS. 4-7 is considered to be the guide wheel 21, which alone is steered by hand, e.g. by an hydraulic system or, according to a given driving program, from an electronic or mechanical device, while the respective angular position of each of the other wheels is adjusted on the basis of a digital value determined by a computer with the interposition of an analog-converter. The computer operates on the basis of the geometric relations represented in FIGS. 4 to 7.

The desired main driving direction with the angle $\alpha_\omega$ relative to a 0° direction, which 0° direction is determined for example with a compass, is for parallel steering, (so $\alpha_\omega$ is the same for all wheels except for turning on the spot when half of wheels have reversed sign of $\alpha_\omega$) and is set or given from an operator's platform (not shown) over a code wheel for guide wheel 21.

A second code wheel, like the first one, transmits for each angular position or motion an electric signal to the computer, representing the instantaneous angle $\alpha_1$ of the guide wheel. In case a correction is needed, the guide wheel is set to the main driving direction $\alpha_\omega$ by adding a correction angle $\Delta\alpha_1$ to the instantaneous angle $\alpha_1$ to be corrected $$\alpha_\omega = \alpha_1 + \Delta\alpha_1$$

When turning, the main driving direction $\alpha_\omega$ allows a maximum correction angle $\Delta\alpha_1$ of turn the guide wheel of e.g. ±90°. In case when more than 90° angle of turn is needed the main driving direction $\alpha_\omega$ must be set in a new position.

In this way any angle of turn of the guide wheel is practicable.

The instantaneous directional angles of the other wheels 22, 23, 24 are $\alpha_2$, $\alpha_3$ and $\alpha_4$ and to each of these angles is added a correction angle $\Delta\alpha_2$, $\Delta\alpha_3$ and $\Delta\alpha_4$. This has the effect that all wheels of the vehicle are set in the correct angle to move the vehicle or its center on an instantaneous arc with the center Dn or D'n. The calculation of the correction angles $\Delta\alpha_2$, $\Delta\alpha_3$ and $\Delta\alpha_4$ for the other three wheels is effected algorithmically by the computer on the basis of the following geometric or mathematical relations.

Figure 4:
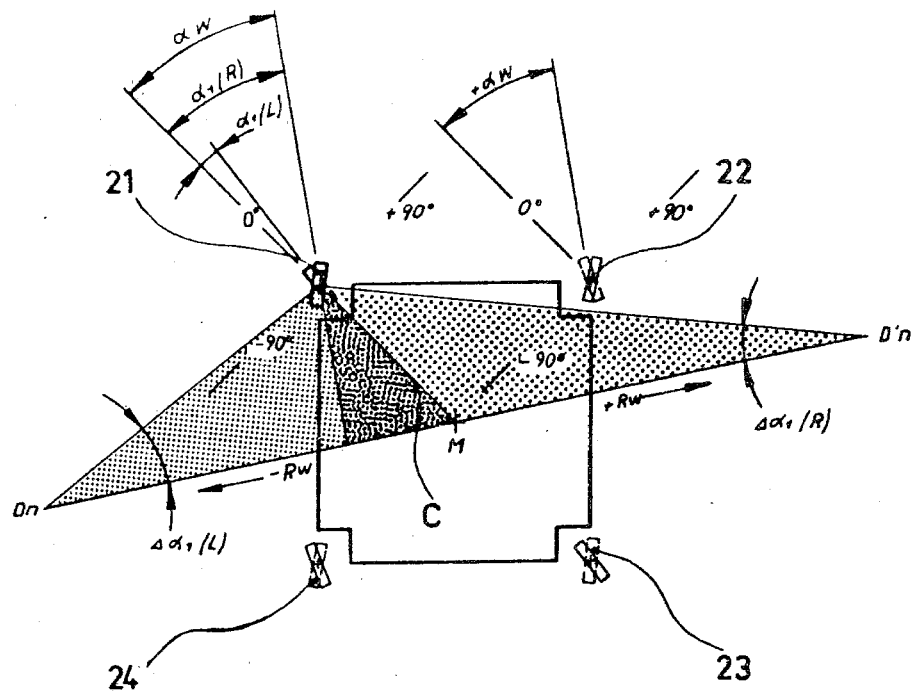
FIGS. 4 to 7 show top views of a vehicle in a schematic representation to illustrate the geometric relations used for calculating the necessary individual wheel directions, showing in the same figures the center of the curve to the left and to the right of the vehicle.

In the left dotted right-angle triangle of the schematic representation in FIG. 4 with hypothenuse 26 between the vertical axis of guide wheel 21 and the rotational center Dn, $\Delta\alpha_1$ or $R_\omega$, that is the radius of Dn to the vehicle center M is known. If $R_\omega$ is not known, it is calculated over the right-angle triangle (center dotted triangle) with hypothenuse C between the vertical wheel axis and the vehicle center, and by means of the angle as follows:

$$R_\omega = C(\cos \alpha_\omega \cot \Delta\alpha_1 + \sin \alpha_\omega)$$

The rotational center Dn is geometrically fixed for all four wheels by the radius Rw of the instantaneous track arc of the vehicle center.

Figure 5:
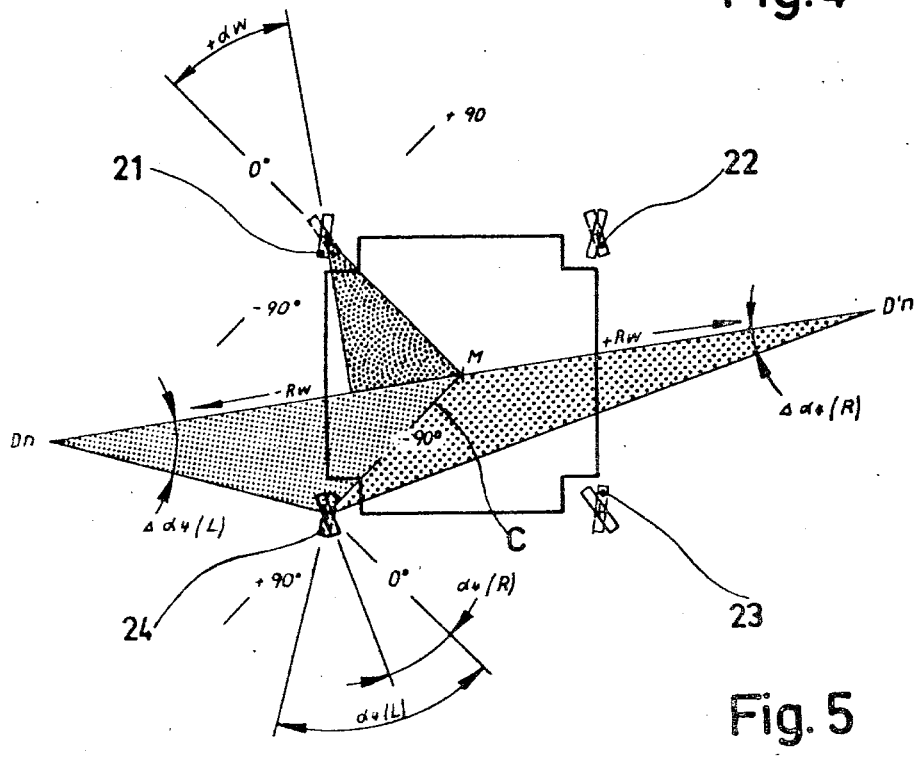

The correction angle $\Delta\alpha_4$ for wheel 24 can be calculated from the triangle (left most dotted triangle) according to FIG. 5 with the corners: vertical wheel axis, vehicle center M and rotational center Dn as follows:

$$\Delta\alpha_4 = \arcsin \Delta\alpha_4 = \frac{\sin \alpha_\omega \cdot C}{\sqrt{(R_\omega^2 + C^2) + (2 R_\omega \cdot C \cos \alpha_\omega)}}$$

Since $\alpha_\omega$ is known, we have $\alpha_4 = \alpha_\omega - \Delta\alpha_4$ if $\Delta\alpha_1 > 0$ and $\alpha_4 = \alpha_\omega + \Delta\alpha_4$, if $\Delta\alpha_1 < 0$.

Figure 6:
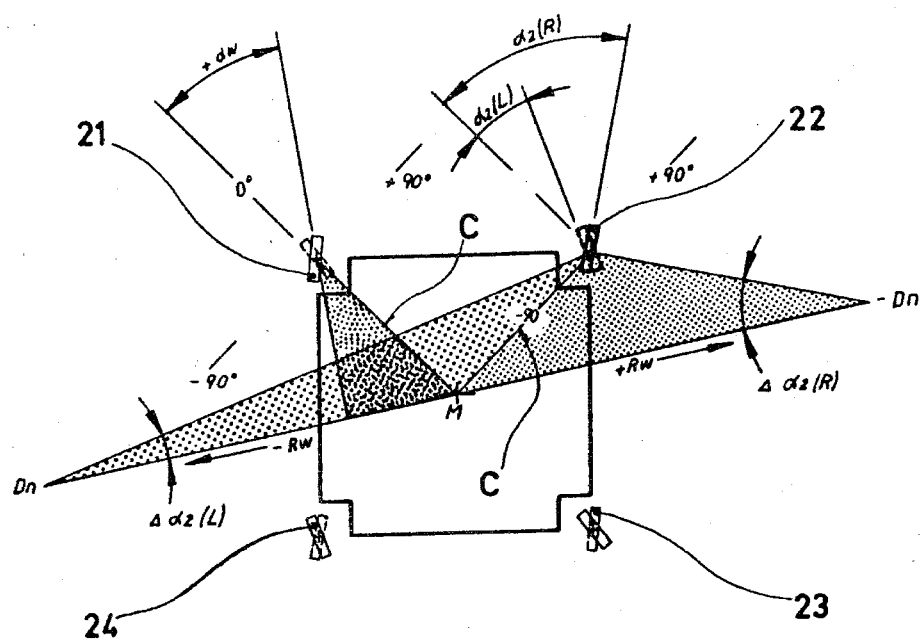
Figure 7:
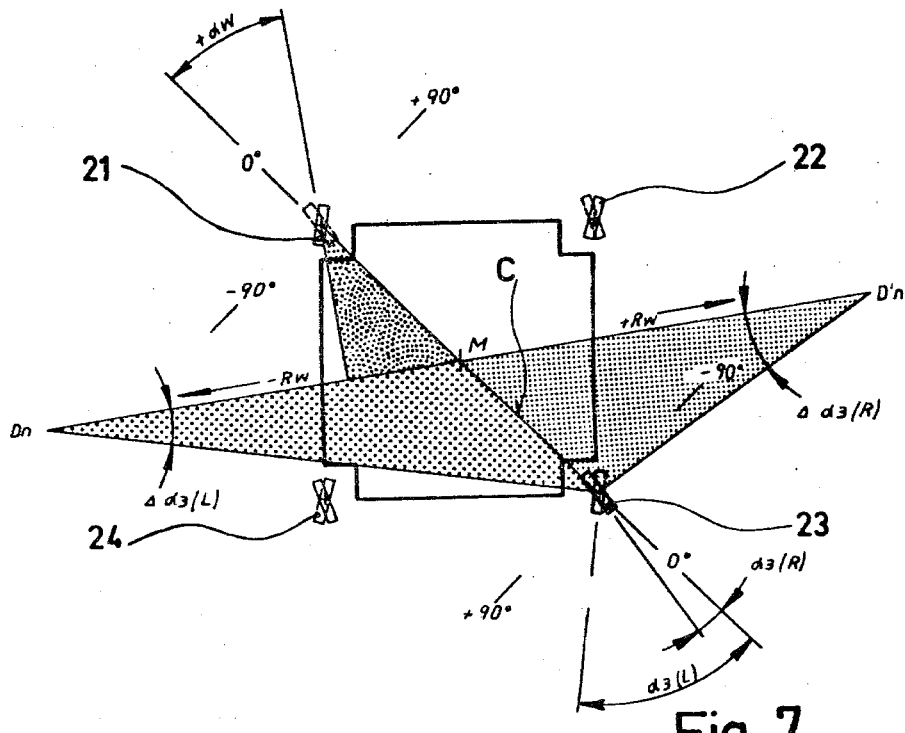

The relation for the correction angle of wheel 22 is obtained from the triangle shown in FIG. 6 with the corners: vertical axis of wheel 22, M, Dn, as follows:

$$\Delta\alpha_2 = \frac{\sin\alpha_\omega \cdot C}{\sqrt{(R_\omega^2 + C^2) - (2R_\omega C \cdot \cos\alpha_\omega)}}$$

and $\alpha_2 = \alpha_\omega + \Delta\alpha_2$, if $\Delta\alpha_2 > 0$, and $\alpha_2 = \alpha_\omega - \Delta\alpha_2$, if $\Delta\alpha_2 < 0$ Finally the correction angle of wheel 23 can be calculated from the triangle shown in FIG. 7 with the corners: vertical wheel axis of wheel 23, M, Dn, as follows:

$$\Delta\alpha_3 = \text{arc sin } \Delta\alpha_3 = \frac{\cos\alpha_\omega \cdot C}{\sqrt{(R_\omega^2 + C^2) - (2R_\omega \cdot C \cdot \sin\alpha_\omega)}}$$

and $\alpha_3 = \alpha_\omega - \Delta\alpha_3$, if $\Delta\alpha_3 > 0$ $\alpha_3 = \alpha_\omega + \Delta\alpha_3$, if $\Delta\alpha_3 < 0$ These triangular relations were given for a rotational center Dn to the left of the vehicle, and the corresponding angles $\Delta\alpha_{1-4}$ are shown in FIGS. 4 to 7 with the index (L).

For a track arc with a rotational center D'n to the right of the vehicle, if the 0° axis is assumed as the center axis, corresponding relations apply, which can be calculated from the triangles with the corners: vertical wheel axis of the respective wheel, vehicle center M, and rotational center D'n.

For the reverse drive the same relations apply, and only the direction of rotation of the wheels about their rolling axis changes.

FIG. 8 shows schematically a flow chart of the computer in the manner as it is customary in digital computations. The legends of the various symbols indicate the respective successive operating stage of the computer. The end of this computing cycle is connected to the start so that the cycle is constantly repeated during the driving movement. Due to the use of electronic circuit packages, which are customary in modern transistor logic (TTL) or of higher integrated circuit packages, the regulation is effected at a high speed, so that a program of the driving directions can be exactly maintained at any driving speed.

The control mechanism, in which the computer operates as a part of the invention, can be designed in various ways, as it is known for the digital automatic control of machine tools, for example. The digital values of the computer arrive in an analog converter, whose output signals are transmitted over amplifiers to the servo-drives, e.g. to the adjusting drives of the individual wheels 21, 22, 23 and 24. Angle transmitter 20 signals the angle achieved back to the computer, after the adjusting drive has been actuated.

The pivoting range of the individual wheels is limited in the computer which examines, for example, whether $\alpha_\omega$ is smaller or greater than $\pm 90°$. In addition, mechanical stops can be provided, since an unlimited mobility of the vehicle in all directions does not require a 360° rotation of the wheels.

Due to its programability, the vehicle is particularly suitable as an aircraft washing truck which drives around the aircraft in steps on predetermined tracks, while its washing apparatus works on the surface of the aircraft. The washing track, which is not essential for the invention, can be designed corresponding to Swiss patent application No. 1097/76 of the same applicant.

FIG. 9 is a schematic diagram of the system. The main driving direction control 40 applies a steering signal to the computer 45 which produces signals which are applied through a D/A converter 47 to form signals for the drive motors 12 for wheels 21, 22, 23 and 24. The transmitter 20 of each wheel provides the actual position feed-back to the computer. This is the case of parallel steering, when all regulating circuits are given the same signal and position value.

In case of correction or other adjustment to driving direction the guide wheel control 48 applies a steering signal direct to drive motor 12 for wheel 21. The angle transmitter 20 for wheel 21 provides a position signal to the computer 45. Computer 45 then produces the correction signals for the drives 12 of wheels 22, 23 and 24. The computer contains the necessary circuits for converting analog position information to digital values to be used by the computer. The signals produced by the computer to contact the steering of wheels 22, 23, 24 are applied to the drives 12 through a digital-analog converter 47.

The system is operative with three wheel vehicles, as well as four wheel vehicles, with one of the wheels of the three being steered as is wheel 21.

What is claimed is:

1. A steering system for a vehicle having a guide wheel and at least two other wheels, the system comprising:
    means for pivotally mounting each of said wheels about a vertical axis;
    means for pivoting each of said wheels to a determinable angle;
    means for setting the angular position of the guide wheel;
    means for determining an angular position for each of said other wheels as a function of the angular position of the guide wheel, the determinable angle being obtained from geometric relationships of triangles defined by a fixed point on the vehicle, the center of an instantaneous track curve for the vehicle and respective pivot axes of each of the wheels of the vehicle; and
    means for adjusting the angular pivoting of each of said other wheels in accordance with said determinable angle.

2. A steering system as in claim 1 further comprising means cooperating with said guide wheel for producing data corresponding to its angular position and for transmitting said data to said determining means.

3. The system of claim 2 in which said determining means comprises:
    means for calculating a first correction angle as a function of both said guide wheel angular position and said determinable angle for the guide wheel; and
    means for calculating a correction angle for each of other wheels as a function of said first correction angle.

4. A steering system as in claim 1 further comprising means cooperating with each of said other wheels for producing data corresponding to the angular position of each of said other wheels and for transmitting said data to said determining means.

5. A steering system as in claim 1 wherein the fixed point on the vehicle is the vehicle center.

6. A steering system as in claim 1 further comprising a hub wheel drive means for each of said wheels.

* * * * *